Jan. 7, 1930.  C. H. WITTHOFFT  1,742,841
BEARING
Filed May 28, 1928

INVENTOR.
Charls H. Whitthofft
BY
ATTORNEY.

Patented Jan. 7, 1930

1,742,841

UNITED STATES PATENT OFFICE

CHARLS H. WITTHOFFT, OF DETROIT, MICHIGAN

BEARING

Application filed May 28, 1928. Serial No. 281,058.

My invention relates to a new and useful improvement in a bearing in which concentrically arranged race forming members are used for retaining ball bearings in position which are interposed therebetween.

In the construction and manufacture of a bearing of this class it has been found quite desirable that the ball bearings be retained between the race forming rings by a locking ring which may cooperate with one of the concentric rings and when in position form a part thereof.

The present invention has as its object the provision of means for locking the locking ring in position whereby the threading of the locking ring on one of the race forming rings is eliminated.

It is another object of the invention to provide in a bearing of this class a locking member having a radially movable part engageable in one of the race forming rings for locking the locking member therein and thus securing the ball bearings in position.

Another object of the invention is the provision in a bearing of the class of a locking mechanism of this class which will be simple in structure economical of manufacture and highly efficient in use.

Other objects will appear hereinafter.

The invention consists in the combination and arrangement of parts hereinafter described and claimed.

The invention will be best understood by a reference to the accompanying drawings which form a part of this specification and in which Fig. 1 is a side elevational view of a bearing embodying the invention with a part broken away and a part shown in section.

Figure 1:
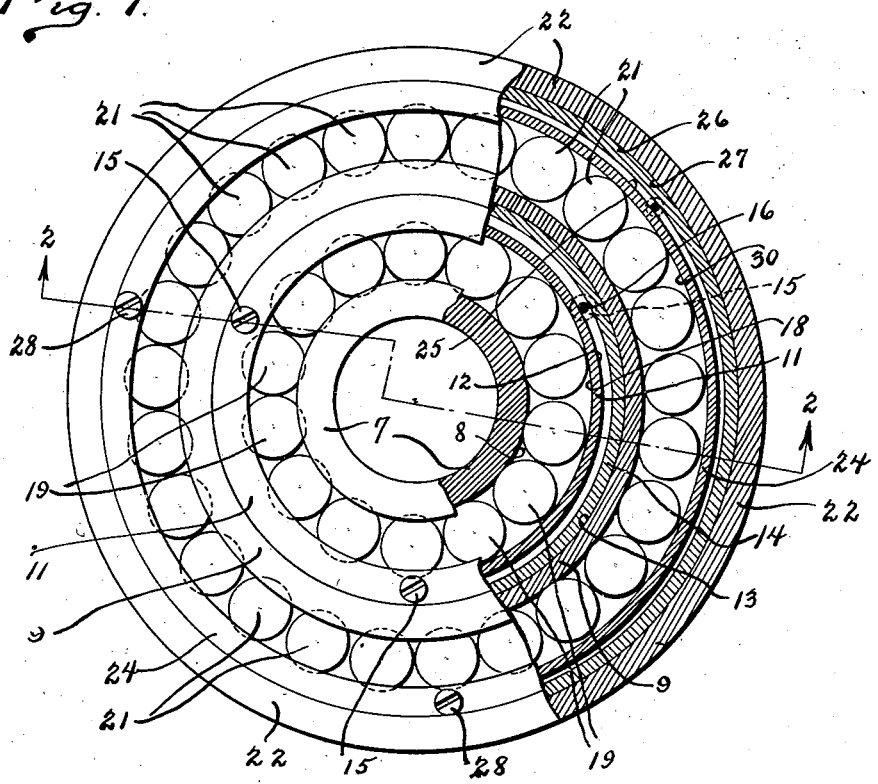
Figure 2:
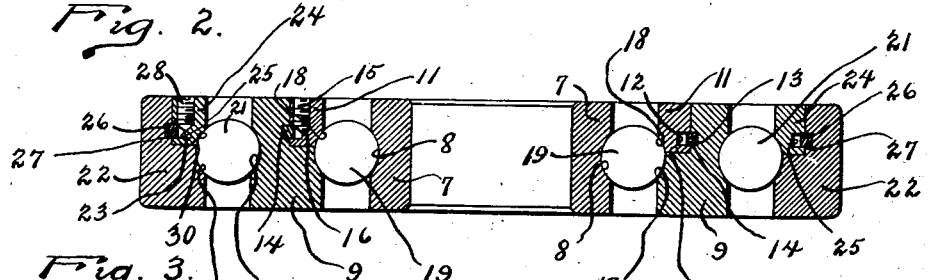
Fig. 2 is a sectional view taken on line 2—2 of Fig. 1.
Figure 3:
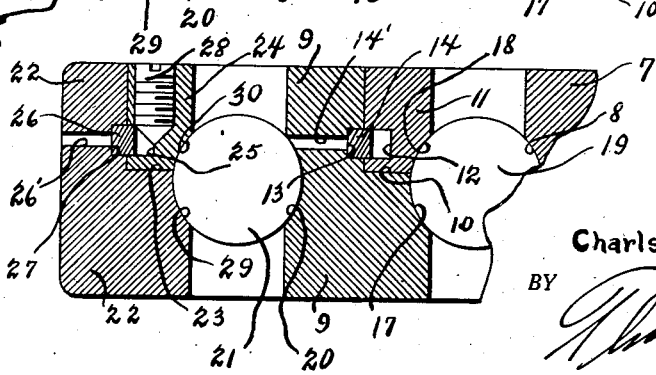
Fig. 3 is an enlarged fragmentary sectional view illustrating the invention.

In the drawings I have illustrated the invention used with a bearing having a center ring 7 adapted for mounting on the shaft or other part with which used. The center ring 7 is provided with a peripheral groove 8. A concentric ring 9 is provided on one of its faces and its inner side with a recess 10 in which engages a ring 11 having a peripheral groove 12 formed adjacent its inner edge adapted to align with a groove 13 formed in the ring 9. Slidably mounted in the groove 12 is a locking ring 14. Threaded axially in the ring 11 are screws 15 having tapered inner ends 16. The ring 9 is formed with a groove 17 which cooperates with a groove 18 formed in the ring 11 to provide in connection with the groove 8 a ball race for the ball bearings 19. In assembly the rings 7 and 9 are arranged in concentric relation, as shown in Fig. 2, and the ball bearings 19 placed in position. The ring 11 with the locking ring 14 thrust inwardly, this locking ring being of a split type to permit its radial movement is then mounted in position, as shown in Fig. 2. The screws 15 are then threaded inwardly, the tapered end 16 engaging the inner surface of the ring 14 and forcing it to engage in the recess 13, and it will be noted that the thickness of the ring 14 is greater than the depth of the recess 13 so that when the ring 14 is thrust fully into the recess 13, this ring will also engage in the recess 12, thus locking the ring 11 is position on the ring 9, and serving to lock the ball bearings 19 in position. Upon threading the screws 15 out of the ring 11 the locking ring 14 may be thrust inwardly by a suitable tool projected through the passageway 14' and the depth of the groove 12 is sufficient to permit the locking ring 14 to lie wholly therein, so that when the locking ring 14 engages fully in the recess 12, the ring 11 may be easily removed therefrom.

In the drawings I have shown a dual bearing in which an outer ring 22 constructed as is the ring 9 is positioned in concentric relation to the ring 9 and spaced therefrom. A recess 23 is formed in the ring 22 for accommodating the ring 24 having the peripheral groove 25 in which the locking ring 26 slidably engages. A groove 27 is formed in the ring 22 for accommodating the locking ring 26 and screws 28 are used for forcing the locking ring 26 into the groove 27. The periphery of the ring 9 is provided with a groove 20 which, cooperating with the grooves 30 and 29, serves as a ball race for the ball bearings 21. A passage 26' is also provided in the ring 22 for insertion of a suitable tool therein to force the locking ring 26 out of the recess 27 when the screws 28 are removed.

In this way, I have formed a simple and positive method of locking ball bearings in position between the concentrically arranged rings, and I have also provided a device which may be easily and quickly assembled.

While I have illustrated and described the preferred form of my invention, I do not wish to limit myself to the precise details of structure shown, but desire to avail myself of such variations and modifications as come within the scope of the appended claims.

Having thus described my invention what I claim as new and desire to secure by Letters Patent is:

1. A bearing of the class described, comprising: concentrically arranged rings in spaced relation to each other; ball bearings positioned between said rings, one of said rings having a recess in its face; a locking ring positioned in said recess for locking said ball bearings in position between said concentric rings; a radially movable member on said locking ring for locking said locking ring in position; and screw operated means for moving said radially movable locking member into locking position.

2. A bearing of the class described, comprising: concentrically arranged rings in spaced relation; ball bearings positioned between said rings, said rings having grooves formed to provide a race way for said ball bearings, one of said rings being cut away at its face; a ring for engaging in said cut away portion and preventing removal of said ball bearings from between said rings; a locking member carried on said engaging ring for locking said engaging ring in said cut away portion; and screw operated means for moving said locking member into operative position.

3. A bearing of the class described, comprising: spaced concentrically arranged rings; ball bearings positioned between said rings, said rings having a cooperating groove for forming a race way for said ball bearings, one of said rings having a cut away portion adjacent one of its faces and provided with a radially extending groove at said cut away portion; a locking ring engageable in said cut away portion having a radially extending groove formed therein, and registering with said first mentioned radially extending groove; a radially movable locking member in the groove of said engaging ring and movable into said first mentioned radially extending groove for locking said ring in said cut away portion; and threaded means for forcing said radially movable locking member into engagement with said grooves.

4. A bearing of the class described, comprising: spaced concentrically arranged rings; ball bearings positioned between said rings, said rings having a cooperating groove for forming a race way for said ball bearings, one of said rings having a cut away portion adjacent one of its faces and provided with a radially extending groove at said cut away portion; a locking ring engageable in said cut away portion having a radially extending groove formed therein, and registering with said first mentioned radially extending groove; a radially movable locking member in the groove of said engaging ring and movable into said first mentioned radially extending groove for locking said ring in said cut away portion; threaded means for forcing said radially movable locking member into engagement with said grooves, the groove in said cut away portion being of less depth than the thickness of said locking member, and the groove in said engaging ring being of greater depth than the thickness of said locking member.

In testimony whereof I have signed the foregoing specification.

CHARLS H. WITTHOFFT.